United States Patent [19]

Herrington et al.

[11] Patent Number: 5,032,622

[45] Date of Patent: Jul. 16, 1991

[54] DENSIFIABLE AND RE-EXPANDABLE POLYURETHANE FOAM

[75] Inventors: Ronald M. Herrington, Brazoria; Robert B. Turner, Lake Jackson, both of Tex.; Robert M. Harnden, Granville, Ohio

[73] Assignee: The Dow Chemical Company, Midland, Mich.

[21] Appl. No.: 547,648

[22] Filed: Jul. 2, 1990

[51] Int. Cl.[5] .............................................. C08G 18/14
[52] U.S. Cl. ...................................... 521/99; 521/174; 521/918; 528/44; 528/76; 528/502; 528/503
[58] Field of Search .......................... 521/99, 174, 918; 528/44, 76, 502, 503

[56]  References Cited

U.S. PATENT DOCUMENTS 4,980,386  12/1990  Tiao et al. ............................ 521/174

Primary Examiner—Maurice J. Welsh

[57]  ABSTRACT

Polyurethane foams having a specified glass transition temperature are densified for transportation or other purposes by heating the foam to a temperature above its $T_g$, compressing the heated foam, and then cooling the compressed foam to a temperature below its $T_g$. The cooled foam remains in a densified state until re-heated to a temperature above its $T_g$, whereupon it re-expands to assume its original dimensions.

13 Claims, No Drawings

DENSIFIABLE AND RE-EXPANDABLE POLYURETHANE FOAM

BACKGROUND OF THE INVENTION

This invention relates to polyurethane foam which can be densified and thermally re-expanded.

Polyurethane foams of various types are well-known and used for a variety of applications, including thermal insulation, packaging, padding, seat cushions, bedding, and the like. As with many low density materials, it is usually desirable to prepare the foam relatively close to the place where it will be used, since the foam takes up a large amount of space per unit weight. Because of this low density, transportation costs per unit weight are very high, and to avoid these costs it is desirable to minimize shipping the foam.

One way to reduce the shipping costs of flexible foam is to compress it for shipping, and permitting it to re-expand upon unloading. In this way, a greater weight of foam can be loaded into a given transport vehicle. However, many foams have a substantial compression set, and thus do not completely regain their original dimensions after unloading. In addition, because the compressed foams tend to re-expand expand, force must continuously be applied against the foam during loading and unloading procedures. The expansive force of the foam also tends to limit the amount of foam which can be packed into a given container, as the walls of the container must be of sufficient strength to withstand those forces. It would therefore be desirable to provide a polyurethane foam which can be easily transported at a relatively high density.

SUMMARY OF THE INVENTION

In one aspect, this invention is a densified polyurethane having a bulk density of from about 30 to about 900 kg/m$^3$ and a $T_g$ of at least about 35° C. but below the decomposition temperature of said polyurethane, which densified polyurethane is thermally expandable without the addition of a blowing agent to form a polyurethane foam having a bulk density of about 5 to about 25% of the bulk density of the densified polyurethane.

In another aspect, this invention is a polyurethane foam having a $T_g$ of at least about 35° C. but below the decomposition temperature of said polyurethane, which foam is the reaction product of a reaction mixture comprising as a major active hydrogen-containing component a polyol having an equivalent weight from about 125 to about 350, a polyisocyanate, and at least 5 parts water per 100 parts of combined weight of all other active hydrogen-containing components, wherein the isocyanate index is from about 50 to about 110.

In a third aspect, this invention is a re-expanded polyurethane foam having a $T_g$ of at least about 35° C. but below the decomposition temperature of said polyurethane, which has been re-expanded by heating a densified polyurethane having a bulk density of about 30 to about 900 kg/m$^3$ to a temperature above its $T_g$ under conditions such that the densified polyurethane re-expands to assume a bulk density of less than about 25% of the bulk density of the densified polyurethane.

In a fourth aspect, this invention is a method for densifying a polyurethane foam having a $T_g$ of at least about 35° C. but below the decomposition temperature of said polyurethane and an initial bulk density, comprising bringing said foam to a temperature in excess of its $T_g$ but below its decomposition temperature, then compressing the heated foam sufficiently that the compressed foam has a bulk density from about 4 to about 20 times the initial bulk density of the polyurethane foam, but not greater than about 900 kg/m$^3$, then cooling the foam to a temperature below its $T_g$ while maintaining it in said compressed state.

This invention provides a simple and effective means for transporting low density polyurethane foam in a densified state. The densified foam is then easily re-expanded by heating to regenerate the low density foam. This invention has other advantages as well. The densified foam can be very easily shaped into a desirable configuration which will appear in the re-expanded foam as well. Thus, this invention provides a means to simplify the shaping of polyurethane foam.

DETAILED DESCRIPTION OF THE INVENTION

In this invention, a polyurethane foam having a specified $T_g$ is heated to a temperature above its $T_g$, compressed, and while compressed, cooled to a temperature below its $T_g$. At a temperature above its $T_g$, the foam exhibits elastomeric properties, allowing it to be easily compressed. Once compressed, cooling the foam below its $T_g$, preferably below about 30° C. causes it to "set" in the compressed configuration, so that it retains its compressed shape with the application of little or no outside force. Thus, the densified polyurethane can be easily packed and shipped in the densified shape. By heating the densified polyurethane to a temperature above its $T_g$, it again exhibits elastomeric properties, and will expand in the absence of applied forces to substantially regain the dimensions of the original foam.

For the purposes of this invention, the $T_g$ of a polymer refers to the temperature at which the polymer undergoes its dominant glass transition, as measured by differential scanning calorimetry. In many of the foams useful herein, the glass transition of interest is very broad, starting at a temperature as low as about −60° C. and continuing until in excess of 35° C. In those cases, the temperature at the high end of the glass transition range is taken as the $T_g$. By "cooling the foam below its $T_g$", it is meant that the foam is cooled to a temperature below the high end of such a broad thermal transition. The terms "glass transition", "glass transition temperature" and "$T_g$" are as defined by Alger in Polymer Science Dictionary, Elsevier Science Publishing Co., Inc. New York (1989). In certain polyurethanes, the use of more than one active hydrogen-containing material in its preparation may cause the foam to have more than one $T_g$. In such cases, the $T_g$ involving the greatest change in tan delta value is the $T_g$ referred to herein. In any case, a foam which is elastomeric above about 35° C. but which becomes rigid enough to maintain a compressed state at a temperature of below about 30° C. is considered to have the required $T_g$.

The minimum $T_g$ of the foam is above the temperature range normally encountered during the period it exists in the densified state. Otherwise, the densified polyurethane would exhibit elastomeric properties, and no longer retain its densified state without the application of outside force. For this reason, the $T_g$ of the foam is advantageously in excess of about 35° C. A minimum $T_g$ of at least about 40° C., more preferably at least 45°, is preferred, to provide a wider range of service temperature. If a higher service temperature is contemplated, then the foam should have a correspondingly higher $T_g$.

Of course, if the foam is to be used and transported primarily at relatively low temperatures, the foam may in such instances have a correspondingly lower $T_g$.

On the other hand, the $T_g$ of the foam must be below a temperature at which significant decomposition of the foam occurs. Preferably, the $T_g$ is up to about 120° C., more preferably up to about 100° C., most preferably up to about 90° C., so that the foam can be easily heated above its $T_g$ for densification, and the densified polyurethane can be easily heated above its $T_g$ for re-expansion.

In densifying the foam, it is advantageously compressed to a density of about 4, preferably about 6, more preferably about 7 times the density of the original foam, up to about 20, more preferably up to about 15, more preferably up to about 12 times the density of the original foam. However, the density of the densified polyurethane should not exceed about 900, preferably about 700, and more preferably about 500 kg/m$^3$. When the foam is densified too greatly (in excess of the density limits set out above), it often cannot be fully re-expanded.

The force needed to compress the foam is a function of its density and physical properties. However, a light to moderate force of about 10 lb/in$^2$ or less, preferably about 1 to about 5 lb/in$^2$ is normally sufficient.

The density of the original foam is not especially critical, although densification for transportation purposes has little practical benefit when the original foam density is greater than about 500 kg/m$^3$. In most instances, the density of the foam is determined by the demands of its intended application. For most insulating and packaging applications, a density of from about 5, preferably about 7, more preferably about 10 kg/m$^3$, up to about 200, more preferably about 50, most preferably about 20 kg/m$^3$ are suitable. It is with these low density foams that this invention is of particular benefit.

The polyurethane foam of this invention is advantageously prepared in the reaction of an active hydrogen-containing composition and a polyisocyanate in the presence of a blowing agent. The desired $T_g$ of the foam is generally related to the equivalent weight of the active hydrogen-containing materials used in said reaction. The use of a major amount, based on the number of equivalents of active hydrogen-containing materials other than water, of an active hydrogen-containing material having an equivalent weight of about 125 to about 350, preferably about 130 to about 250, generally provides the foam with a glass transition temperature in the desired range. Such a material is referred to for convenience herein as a "high $T_g$ polyol". The high $T_g$ polyol preferably constitutes about 60 to about 98, more preferably about 80 to about 98, most preferably about 90 to about 95 equivalent percent of all active hydrogen-containing materials other than water. The high $T_g$ polyol is preferably a polyether polyol having a functionality of about 2 to about 8, more preferably about 2 to about 6, and is more preferably a polymer of propylene oxide and/or ethylene oxide.

In addition to the high $T_g$ polyol, it is advantageous, although not critical, to employ a higher equivalent weight active hydrogen-containing material in the reaction mixture in a minor amount on an equivalents basis. Such a material typically provides the foams with a second $T_g$ well below room temperature, so that the foam retains some elastomeric character at room temperature. This has been found to improve the foam's ability to resume its original dimensions when re-expanded. Accordingly, the active hydrogen-containing composition preferably comprises an active hydrogen-containing material having an equivalent weight in excess of about 350 to about 8000, preferably about 800 to about 3000, more preferably about 1000 to about 2500. This higher equivalent weight material is preferably a polyether polyol or polyester polyol nominally having about 2 to about 4 active hydrogen-containing groups per molecule, and most preferably is a polymer of ethylene oxide and/or propylene oxide nominally having 2 to about 3 hydroxyl groups per molecule. The so-called polymer polyols such as dispersions of polyurea, polyurethane, polyurethane-urea, and vinyl polymer and copolymer particles in polyether polyols are also suitable. Examples of such dispersions are described in U. S. Pat. Nos. 4,374,209, 4,324,716 and 4,460,715. This higher equivalent weight material advantageously constitutes about 2 to about 40, preferably about 2 to about 20, more preferably about 5 to about 10 percent of the total equivalents of active hydrogen-containing materials other than water.

The polyisocyanates useful herein include those organic compounds having an average of at least about 2.0 isocyanate groups per molecule. Those containing aliphatically bound or aromatically bound isocyanate groups are useful herein. Suitable aliphatic polyisocyanates include ethylene diisocyanate, 1,4-tetramethylene diisocyanate, 1,6-hexamethylene diisocyanate, 1,12-dodecane diisocyanate, cyclobutane -1,3-diisocyanate, cyclohexane-1,3- and -1,4-diisocyanate, 1,5-diisocyanato-3,3,5-trimethylcyclohexane, hydrogenated 2,4- and/or 2,6-hexahydrotoluene diisocyanate, hydrogenated -2,4'- and/or -4,4'-diphenylmethanediisocyanate (H$_{12}$MDI), isophorone diisocyanate, and the like.

Suitable aromatic polyisocyanates include, for example, 2,4- and/or 2,6-toluene diisocyanate (TDI), 1,3- and 1,4-phenylene diisocyanate, 4,4'-diphenylmethane diisocyanate (including mixtures thereof with minor quantities of the 2,4'-isomer) (MDI), 1,5-naphthylene diisocyanate, triphenylmethane-4,4',4'''-triisocyanate, polyphenylpolymethylene polyisocyanates, (PMDI) and the like.

In addition, derivatives and prepolymers of the foregoing polyisocyanates such as those containing urethane, carbodiimide, allophanate, isocyanurate, acylated urea, biuret, ester and similar groups are useful herein.

Of the foregoing polyisocyanates, TDI, MDI, isophorone diisocyanate, H$_{12}$MDI, hexamethylene diisocyanate, cyclohexane diisocyanate and derivatives thereof are preferred due to their cost, commercial availability and performance. It is also preferred, especially in high water formulations, that a polyisocyanate or mixture thereof having an average functionality of at least about 2.1, more preferably at least about 2.2 isocyanate groups per molecule be used. TDI, MDI and derivatives and prepolymers of MDI are particularly preferred. Most preferred are polymeric MDI and mixtures thereof with MDI and TDI.

The polyisocyanate is advantageously used in an amount sufficient to provide an isocyanate index of about 60 to about 110, preferably about 70 to about 100, and in high water formulations, more preferably about 70 to about 90. "Isocyanate index" refers to 100 times the ratio of isocyanate groups to active hydrogen-containing groups in the reaction mixture.

A blowing agent is a material which generates a gas under the conditions of the reaction of the active hydrogen-containing composition and the polyisocyanate. Suitable blowing agents include water, low-boiling organic compounds, the so-called "azo" compounds which generate nitrogen, and the like. Among the low boiling organic compounds are the hydrocarbons and halogenated hydrocarbons such as pentane, hexane, methylene chloride, Refrigerant 11, Refrigerant 12, Refrigerant 123, and Refrigerant 142-B and the like. Other organic blowing agents include those described in PCT Published Application WO 89/00594, incorporated herein by reference. Preferably, however, water, which generates carbon dioxide upon reaction with an isocyanate, is the primary blowing agent and is most preferably the sole blowing agent.

The blowing agent is used in an amount sufficient to provide the desired density to the foam. When used as the sole blowing agent, from about 3 to about 25, preferably about 5 to about 20, most preferably about 10 to about 18 parts by weight are advantageously used per 100 parts by weight of the other active hydrogen-containing materials. Those formulations containing at least about 5 parts by weight water per 100 parts by weight of the other active hydrogen-containing materials are referred to herein as "high water" formulations.

In addition to the foregoing, other components which are useful in preparing the foam include materials such as surfactants, catalysts, cell size control agents, cell opening agents, colorants, antioxidants, preservatives, mold release agents, static dissipative agents and the like. Among these, the use of surfactants and catalysts is preferred.

Surfactants suitable for use herein include but are not limited to the silicone surfactants and the alkali metal salts of fatty acids. The silicone surfactants are preferred, especially the block copolymers of an alkylene oxide and a dimethylsiloxane.

Suitable catalysts include tertiary amine compounds and organometallic compounds. Exemplary tertiary amine catalysts include, for example, triethylenediamine, N-methylmorpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the active hydrogen-containing materials.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example in U.S. Pat. No. 2,846,408, incorporated herein by reference. Advantageously about 0.001 to about 0.5 part by weight of an organometallic catalyst is used per 100 parts of the active hydrogen-containing materials.

It is often desired to employ a static dissipative agent in making the foam, or to treat the finished foam with such an agent. Of particular interest are effective amounts of a non-volatile, ionizable metal salt, optionally in conjunction with an enhancer compound, as described in U.S. Pat. Nos. 4,806,571, 4,618,630 and 4,617,325. Of particular interest is the use of up to about 3 weight percent of sodium tetraphenylboron or a sodium salt of a perfluorinated aliphatic carboxylic acid having up to about 8 carbon atoms.

In making the foam, either free-rise (slabstock) or molding techniques can be used. In slabstock processes, the reactants are mixed and poured onto a conveyor where the reacting mixture rises against its own weight and cures. In the molding techniques, the reactants are mixed and dispensed into a mold where they react, filling the mold and assuming the shape of the mold cavity.

The use of high water formulations in this invention leads to the production of a high exotherm during the foaming reaction. This drives the temperatures inside the forming foam quite high, so that unless good heat removal occurs, significant discoloration or even burning of the foam can occur. Thus, it is preferred to restrict the use of the high water formulations to the production of smaller cross-section foams, so that removal of the heat of reaction can be effected. Preferably, foam having a cross-sectional area of 1500 in$^2$ or less, more preferably about 600 in$^2$ or less, is made.

It is often desirable to post-cure the foam after initial foaming (and demolding in the case of molded foam) to develop optimal physical properties. Post curing can be done under ambient conditions for a period of about 12 hours to seven days, or under elevated temperatures for a period of about 10 minutes to about 3 hours.

It is often desirable to mechanically open the cell walls of the foam. This is most conveniently done by crushing.

After curing, the foam may, if desired, be fabricated by cutting it into a desired shape. This fabrication can be done either before or after densification.

The resulting foam, due to its high $T_g$, is particularly useful in packaging applications. However, it is also useful in cushioning and other energy-absorbing applications.

The following examples are given to illustrate the invention and are not intended to limit the scope thereof. Unless stated otherwise, all parts and percentages are given by weight.

EXAMPLE 1

A polyurethane foam is prepared from the components listed in Table 1.

TABLE 1

| Component | Parts by Weight |
|---|---|
| Polyol A[1] | 50 |
| Polyol B[2] | 50 |
| Water | 18 |
| Silicone Surfactant | 0.75 |
| Amine Catalyst A[3] | 0.3 |
| Amine Catalyst B[4] | 0.5 |
| Amine Catalyst C[5] | 0.1 |
| TDI mixture[6] | 131.1 |
| PMDI[7] | 32.8 |

[1] A nominally trifunctional poly (propylene oxide) of 271 equivalent weight.
[2] A nominally difunctional ethylene oxide-capped poly(propylene oxide) of 2000 equivalent weight.
[3] 33% triethylene diamine in dipropylene glycol.
[4] Dimethyl ethylamine.
[5] 70% bis (dimethylaminoethyl ether) in dipropylene glycol.
[6] An 80/20 mixture of the 2,4- and 2,6- isomers.
[7] A polymeric MDI having an average functionality of about 2.3 and an equivalent weight of about 131.

All components except isocyanates are thoroughly mixed at room temperature, and then the isocyanates are added with vigorous mixing. The resulting mixture is poured immediately into an open box and permitted to react until it has fully expanded and assumed stable dimensions. The foam is then post-cured in a 120° C. oven for about fifteen to about twenty minutes and cooled. The cooled foam is crushed to break cell walls, yielding an open-celled, semi-rigid foam having a bulk density of about 8 to 9.6 kg/m$^3$.

The foam is densified by heating it to about 90-100° C. until soft and compressing it to about ten times its original density. While under compression, the foam is cooled back to room temperature. The cooled foam, being below its $T_g$, retains its compressed dimensions. Upon reheating to a temperature above its $T_g$, the foam re-expands to assume its original dimensions.

EXAMPLE 2

A polyurethane foam is prepared from the components listed in Table 2.

TABLE 2

| Component | Parts by Weight |
|---|---|
| Polyol C[1] | 113 |
| Polyol B[2] | 113 |
| Copolymer Polyol[3] | 22.5 |
| Water | 31.5 |
| Silicone Surfactant | 2.25 |
| Dimethylethylamine | 1.13 |
| N,N-dimethyl aminoethanol | 2.25 |
| Stannous Octoate | 0.23 |
| Amine Catalyst C | 0.9 |
| PMDI[4] | 593 |

[1] A nominally trifunctional poly (propylene oxide) of 135 equivalent weight.
[2] A nominally difunctional ethylene oxide-capped poly (propylene oxide) of 2000 equivalent weight.
[3] A 43% solids styrene/acrylonitrile copolymer polyol having an equivalent weight of about 1750.
[4] A polymeric MDI having a functionality of about 2.7.

The foam is prepared in the same general manner as described in Example 1. It exhibits a thermal transition beginning at about —120° C. and ending at about —65° C., and a broader thermal transition beginning at about —65° C. and ending at about 40° C. The tan delta changes by about 0.026 units over the lower range and about 0.032 units over the higher temperature range, indicating that the higher temperature transition is the major one for this polymer. The product has a density of about 0.99 pound/cubic foot, and is densified according to the procedure described in Example 1 to form a densified product having a density of about 8 kg/m$^3$. The densified foam assumes its original dimensions upon heating to about 90-100° C.

The compressive strength and modulus of the foam is determined according to ASTM D-3574-86. At 5% deflection, the compressive strength is about 5.8 psi on first testing, and on subsequent testing, the compressive strength is about 1.6 psi. At 25% deflection, the compressive strength is about 5.7 psi on first testing, and the compressive strength on subsequent testing is about 2.6 psi. Compressive modulus is about 190 psi initially. In addition, the foam exhibits compressive creep and compressive set properties similar to polyethylene packaging foams.

EXAMPLE 3

Polyurethane foam Samples A and B are prepared from the components listed in Table 3. Sample A has a bulk density of about 13.1 kg/m$^3$, and that of Sample B is about 13.3 kg/m$^3$. Both foams are readily densified according to the process described in Example 1 to form a densified product having a density of about 8 lb/ft$^3$. Each assumes its original dimensions upon heating to about 90-100° C.

Foam Sample A exhibits a thermal transition between about —120° C. and about —65° C., and a broader thermal transition beginning at about —60° C. and ending at about 40° C. The change in tan delta over the lower temperature transition is about 0.022 units, whereas that over the higher temperature transition is about 0.038 units. This indicates that the higher temperature transition is the major one in this polymer.

TABLE 3

| Component | Parts by Weight | |
|---|---|---|
| | Sample A | Sample B |
| Polyol D[1] | 150 | 0 |
| Polyol E[5] | 0 | 150 |
| Polyol B[2] | 150 | 150 |
| Copolymer Polyol[3] | 30 | 30 |
| Water | 42 | 42 |
| Silicone Surfactant | 3.0 | 3.0 |
| Dimethylethylamine | 1.5 | 1.5 |
| N,N-dimethyl aminoethanol | 3.0 | 3.0 |
| Stannous Octoate | 0.3 | 0.3 |
| Amine Catalyst C | 0.9 | 0.9 |
| PMDI[4] | 631 | 619 |

[1] A nominally trifunctional poly (propylene oxide) of 200 equivalent weight.
[2] A nominally difunctional ethylene oxide-capped poly (propylene oxide) of 2000 equivalent weight.
[3] A 43% solids styrene/acrylonitrile copolymer polyol having an equivalent weight of about 1750.
[4] A polymeric MDI having a functionality of about 2.7.
[5] A nominally trifunctional poly (propylene oxide) of 231 equivalent weight.

The compressive strength and modulus of the foams are determined according to ASTM D-3574-86. At 5% deflection, the compressive strengths of Samples A and B are about 4.0 and 3.8 psi, respectively, on first testing, and the compressive strengths are about 1.4 and 1.6 psi, respectively, on subsequent testing. At 25% deflection, the compressive strengths are about 4.2 and 3.9 psi, respectively, on first testing and the compressive strengths are about 2.2 and 2.3 psi, respectively, on subsequent testing. Compressive moduli are about 120 and about 95 psi, respectively, on first testing. In addition, the foams exhibit compressive creep and compressive set properties similar to polyethylene packaging foams.

What is claimed is:

1. A densified polyurethane having a bulk density of from about 30 to about 900 kg/m$^3$ and a $T_g$ of at least about 35° C. but below the decomposition temperature of said polyurethane, which densified polyurethane is thermally expandable without the addition of a blowing agent to form a polyurethane foam having a bulk density of about 5 to about 25% of the bulk density of the densified polyurethane.

2. The densified polyurethane of claim 1 which is the reaction product of a reaction mixture comprising as a major active hydrogen-containing component a polyol having an equivalent weight from about 125 to about 350, a polyisocyanate, and at least about 5 parts water per 100 parts of combined weight of all active hydrogen-containing components, wherein the isocyanate index is from about 50 to about 110.

3. The densified polyurethane of claim 2 wherein said major active hydrogen-containing component is a polyether polyol having an equivalent weight from about 130 to about 250.

4. The densified polyurethane of claim 3 wherein said reaction mixture further comprises an additional active hydrogen-containing material having an equivalent weight of about 800 to about 3000, and wherein the number of equivalents of said major active hydrogen-containing component constitutes about 60 to about 98% of the total number of equivalents of all active hydrogen-containing materials other than water.

5. The densified polyurethane of claim 4 wherein said polyisocyanate is MDI, polymeric MDI, TDI or a mixture thereof.

6. A polyurethane foam having a $T_g$ of at least about 35° C. but below the decomposition temperature of said polyurethane, which foam is the reaction product of a reaction mixture comprising as a major active hydrogen-containing component a polyol having an equivalent weight from about 125 to about 350, a polyisocyanate, and at least about 5 parts water per 100 parts of combined weight of all active hydrogen-containing components, wherein the isocyanate index is from about 50 to about 110.

7. The foam of claim 6 wherein said major active hydrogen-containing component is a polyether polyol having an equivalent weight from about 130 to about 250.

8. The foam of claim 7 wherein said reaction mixture further comprises an additional active hydrogen-containing material having an equivalent weight of about 800 to about 3000, and wherein said major active hydrogen-containing component constitutes about 60 to about 98% of the total number of equivalents of all active hydrogen-containing materials other than water.

9. The foam of claim 8 wherein said polyisocyanate is MDI, polymeric MDI, TDI or a mixture thereof.

10. The foam of claim 9 further comprising an amount of a non-volatile, ionizable metal salt sufficient to render the foam static dissipative.

11. A re-expanded polyurethane foam having a $T_g$ of at least about 35° C. but below the decomposition temperature of said polyurethane, which has been re-expanded by heating a densified polyurethane having a bulk density of about 30 to about 900 kg/m³ to a temperature above its $T_g$ under conditions such that the densified polyurethane re-expands to assume a bulk density of less than about 25% of the bulk density of the densified polyurethane.

12. A method for densifying a polyurethane foam having a $T_g$ of at least about 35° C. but below the decomposition temperature of said polyurethane and an initial bulk density, comprising bringing said foam to a temperature in excess of its $T_g$ but below said decomposition temperature, then compressing the heated foam sufficiently that the compressed foam has a bulk density from about 4 to about 20 times the initial bulk density of the polyurethane foam, but not greater than about 900 kg/m³, then cooling the foam to a temperature below about 30° C. while maintaining the foam in said compressed state.

13. A loose-fill packing comprising a foam of claim 6 in a particulate form.

* * * * *